US010310306B2

(12) United States Patent
Hao

(10) Patent No.: US 10,310,306 B2
(45) Date of Patent: Jun. 4, 2019

(54) LIQUID CRYSTAL DISPLAY PANEL AND APPARATUS

(71) Applicant: Shenzhen China Star Optoelectronics Semiconductor Display Technology Co., Ltd., Shenzhen, Guangdong (CN)

(72) Inventor: Sikun Hao, Shenzhen (CN)

(73) Assignee: SHENZHEN CHINA STAR OPTOELECTRONICS SEMICONDUCTOR DISPLAY TECHNOLOGY CO., LTD. (CN)

( * ) Notice: Subject to any disclaimer, the term of this patent is extended or adjusted under 35 U.S.C. 154(b) by 0 days.

(21) Appl. No.: 15/572,821

(22) PCT Filed: Nov. 2, 2017

(86) PCT No.: PCT/CN2017/109085
§ 371 (c)(1),
(2) Date: Nov. 9, 2017

(87) PCT Pub. No.: WO2018/223591
PCT Pub. Date: Dec. 13, 2018

(65) Prior Publication Data
US 2018/0356662 A1    Dec. 13, 2018

(30) Foreign Application Priority Data

Jun. 7, 2017 (CN) .......................... 2017 1 0423649

(51) Int. Cl.
G02F 1/133 (2006.01)
G02F 1/1362 (2006.01)
G09G 3/36 (2006.01)

(52) U.S. Cl.
CPC .... *G02F 1/13306* (2013.01); *G02F 1/136213* (2013.01); *G02F 1/136286* (2013.01); *G09G 3/3648* (2013.01); *G02F 2201/121* (2013.01); *G09G 2300/0852* (2013.01)

(58) Field of Classification Search
CPC .. G09G 3/3648; G09G 3/36; G02F 1/134336; G02F 2001/134345; G02F 2001/134354
See application file for complete search history.

(56) References Cited

U.S. PATENT DOCUMENTS

| 2008/0106660 A1* | 5/2008 | Kitayama | G09G 3/3655 349/39 |
| 2009/0195487 A1* | 8/2009 | Shimoshikiryoh | G09G 3/3614 345/89 |
| 2017/0045789 A1* | 2/2017 | Yamakawa | G02F 1/134336 |

* cited by examiner

*Primary Examiner* — Koosha Sharifi-Tafreshi
(74) *Attorney, Agent, or Firm* — Emerson, Thomson & Bennett, LLC; Roger D. Emerson

(57) ABSTRACT

The present disclosure provides a liquid crystal display panel and apparatus which includes a first pixel unit and a second pixel unit. The first pixel unit includes a first thin film transistor, a first charging capacitor, a second charging capacitor. One side of the first charging capacitor is connected the drain of the first thin film transistor. the other side of the first charging capacitor is connected the second charging capacitor; the second pixel unit includes a second thin film transistor; the drain of the second thin film transistor is connected to the other side of the first charging capacitor.

18 Claims, 10 Drawing Sheets

--Prior Art--

--Prior Art--

LIQUID CRYSTAL DISPLAY PANEL AND APPARATUS

FIELD OF THE INVENTION

The present disclosure relates to the field of display technology, and more particularly to a liquid crystal display panel and an apparatus.

BACKGROUND OF THE INVENTION

Liquid crystal displays (LCD) are one of the fastest-developed flat panel displays due to having light and thin characteristics. However, thin film transistor LCDs (TFT-LCDs) have a relatively narrow viewing angle in comparison to cathode ray tube (CRT) displays. This drawback prevents its utilization in upmarket display fields which require broad viewing angles, like aviation and medical fields, etc.

Products, whose viewing angles can reach 85 or more degrees horizontally and vertically, have appeared recently with the development of viewing angle technology in LCDs. The viewing angle technologies applied to LCDs include multi-domain vertical alignment (MVA) and in plane switching (IPS). One advantage of MVA is the high contrast ratio which can reach 4000:1 and above; IPS makes the liquid crystals be switched through the electrical field by repeatedly arranging pixel electrodes and common electrodes in parallel. Therefore, wide viewing angles are achieved, but the contrast ratio is generally below 2000:1, which is relatively low.

Major solutions to increase the viewing angle involve making brightness of main pixel units and sub-pixel units different. As shown in FIG. 1, each pixel units of present liquid crystal display panels include a main pixel area and a sub-pixel area. The main pixel area includes a first thin film transistor T1, a first storage capacitor Cst1, a first liquid crystal capacitor Clc1, a first capacitor C1, and a second capacitor C2. The sub-pixel area includes a second thin film transistor T2, a third thin film transistor T3, a second storage capacitor Cst2, and a second liquid crystal capacitor Clc2. The gate of the first thin film transistor T1 and the gate of the second thin film transistor T2 are both connected to scan line Gn. The source of the first thin film transistor T1 and the source of the second thin film transistor T2 are connected to a data line Data. One side of both the first storage capacitor Cst1 and the first liquid crystal capacitor Clc1 are connected to a drain of the first thin film transistor T1. The other side of the first storage capacitor Cst1 is connected to a common electrode disposed on the side of the array substrate. The other side of the first liquid crystal capacitor Clc1 is connected to a common electrode disposed on the side of the color film substrate. One side of the first capacitor C1 is connected to the drain of the first thin film transistor T1, the other side of the first capacitor C1 is connected to the second capacitor C2. The other side of the second capacitor C2 is connected to a common electrode of the array substrate.

One side of both the second storage capacitor Cst2 and the second liquid crystal capacitor Clc2 are connected to a drain of the second thin film transistor T2. The other side of the second storage Cst2 is connected to a common electrode of the array substrate; the other side of the second liquid crystal Clc2 is connected to a common electrode of the color film substrate. The drain of the second thin film transistor T2 is connected the source of the third thin film transistor T3. The drain of the third thin film transistor T3 is connected to a node between the first capacitor and the second capacitor. The gate of the third thin film transistor T3 is connected to scan line Gn+1.

As shown in FIG. 2, Va and Vb represent the voltage of a main pixel region and a sub-pixel region respectively. During t1-t2, the signal of the scan line Gn is high, T1 and T2 are closed, T3 is opened, Va and Vb are both at high potential. At the time t2, the scan line Gn is closed, the scan line Gn+1 is opened, T1 and T2 are opened, T3 is closed, the second liquid crystal capacitor Clc2 discharges in order to charge the lower-substrate of the first capacitor C1, the voltage of Va is increased, i.e., Va is higher than Vb, so that the viewing angle is increased. However aperture ratio and the transmittance ratio will decrease since the number of the thin film transistors is higher.

Therefore, a liquid crystal display panel and apparatus is required to solve the problems of present technology.

SUMMARY OF THE INVENTION

The object of this disclosure is providing a liquid crystal display panel and apparatus which can increase the aperture ratio.

To solve the abovementioned technical problems, the present disclosure provides a liquid display panel which includes:

a plurality of data lines, a plurality of scan lines, and a plurality of pixel sets comprising a first pixel unit and a second pixel unit; the scan lines being correspondingly connected to the pixel units arranged row by row, the data lines being correspondingly connected to the pixel units arranged column by column;

the first pixel unit comprises a first thin film transistor, a first charging capacitor, a second charging capacitor, a first storage capacitor, and a first liquid crystal capacitor; a gate of the first thin film transistor is connected to a corresponding scan line, and a source of the first thin film transistor is connected to a corresponding data line; the first charging capacitance is connected between a drain of the first thin film transistor, and the second charging capacitor; the first storage capacitor and the first liquid crystal capacitor are connected to the drain of the first thin film transistor;

the second pixel unit comprises a second thin film transistor, a second storage capacitor, and a second liquid crystal capacitor; a gate of the second thin film transistor is connected to a corresponding scan line, a source of the second thin film transistor is connected to a corresponding data line; a drain of the second thin film transistor is connected to the first charging capacitor, the second storage capacitor and the second liquid crystal capacitor are connected to the drain of the second thin film transistor; wherein a brightness of the first pixel unit is higher than a brightness of the second pixel unit.

In the liquid crystal display panel of the present disclosure, the first pixel unit and the second pixel unit are arranged in alternating rows.

In the liquid crystal display panel of the present disclosure, the first pixel unit and the second pixel unit are arranged alternately.

In the liquid crystal display panel of the present disclosure, the first pixel unit is disposed on an nth row and a (2k+1)th column or an (n+1)th row and a (2k)th column; the second pixel unit is disposed on an (n+1)th row and a (2k+1)th column or an nth row and a (2k)th column, where the liquid crystal display panel comprises n rows of pixel units, where $0<n<N$, $N\geq 2$, $k\geq 0$.

In the liquid crystal display panel of the present disclosure, the liquid crystal display panel comprises a first region and a second region, the first pixel unit of the first region is disposed on a same row with the second pixel unit of the second region; the second pixel unit of the first region is disposed on a same row with the first pixel unit of the second region.

In the liquid crystal display panel of the present disclosure, an area of the first region is equal to an area of the second region.

In the liquid crystal display panel of the present disclosure, the liquid crystal display panel comprises two first regions and a second region between the two first regions.

In the liquid crystal display panel of the present disclosure, a total area of the two first regions is equal to the area of the second region.

To solve the abovementioned technical problems, the present disclosure provides a liquid crystal display panel which includes:

a plurality of data lines, a plurality of scan lines, and a plurality of pixel sets comprising a first pixel unit and a second pixel unit; the scan lines being correspondingly connected to the pixel units arranged row by row, the data lines being correspondingly connected to the pixel units arranged column by column;

the first pixel unit comprises a first thin film transistor, a first charging capacitor, and a second charging capacitor; a gate of the first thin film transistor is connected to a corresponding scan line, and a source of the first thin film transistor is connected to a corresponding data line; the first charging capacitor is connected between a drain of the first thin film transistor, and the second charging capacitor;

the second pixel unit comprises a second thin film transistor; a gate of the second thin film transistor is connected to a corresponding scan line, a source of the second thin film transistor is connected to a corresponding data line; a drain of the second thin film transistor is connected to the first charging capacitor.

In the liquid crystal display panel of the present disclosure, the first pixel unit and the second pixel unit are arranged in alternating rows.

In the liquid crystal display panel of the present disclosure, the first pixel unit and the second pixel unit are arranged alternately.

In the liquid crystal display panel of the present disclosure, the first pixel unit is disposed on an nth row and a (2k+1)th column or an (n+1) row and a (2k)th column; the second pixel unit is disposed on an (n+1)th row and a (2k+1)th column or an nth row and a (2k) column, where the liquid crystal display panel comprises n rows of pixel units, where 0<n<N, N≥2, k≥0.

In the liquid crystal display panel of the present disclosure, the liquid crystal display panel comprises a first region and a second region, the first pixel unit of the first region is disposed on the same row with the second pixel unit of the second region; the second pixel unit of the first region is disposed on the same row with the first pixel unit of the second region;

the first pixel unit of the first region is arranged in alternating rows with the second pixel unit of the first region; the first pixel unit of the second region is arranged in alternating rows with the second pixel unit of the second region.

In the liquid crystal display panel of the present disclosure, an area of the first region is equal to an area of the second region.

In the liquid crystal display panel of the present disclosure, the liquid crystal display panel comprises two first regions and a second region between the two first regions.

In the liquid crystal display panel of the present disclosure, a total area of the two first regions is equal to the area of the second region.

In the liquid crystal display panel of the present disclosure, the brightness of the first pixel unit is higher than a brightness of the second pixel unit.

The present disclosure further provides a liquid crystal display apparatus includes a backlight module and any one of the abovementioned liquid crystal display panels.

The liquid crystal display panel and apparatus of present disclosure keeps charging to the previous pixel unit while charging to the next pixel unit, in order to make the brightness of the adjacent pixel units different and increase the viewing angle of the liquid crystal display panel. In addition, the number of the thin film transistors and capacitors is decreased, thus the aperture ratio and transmittance ratio are increased.

DETAILED DESCRIPTION OF THE PREFERRED EMBODIMENTS

The illustrations of the following embodiments take the attached drawings as reference to indicate the applicable specific examples of the present disclosure. The mentioned directional terms, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 3:
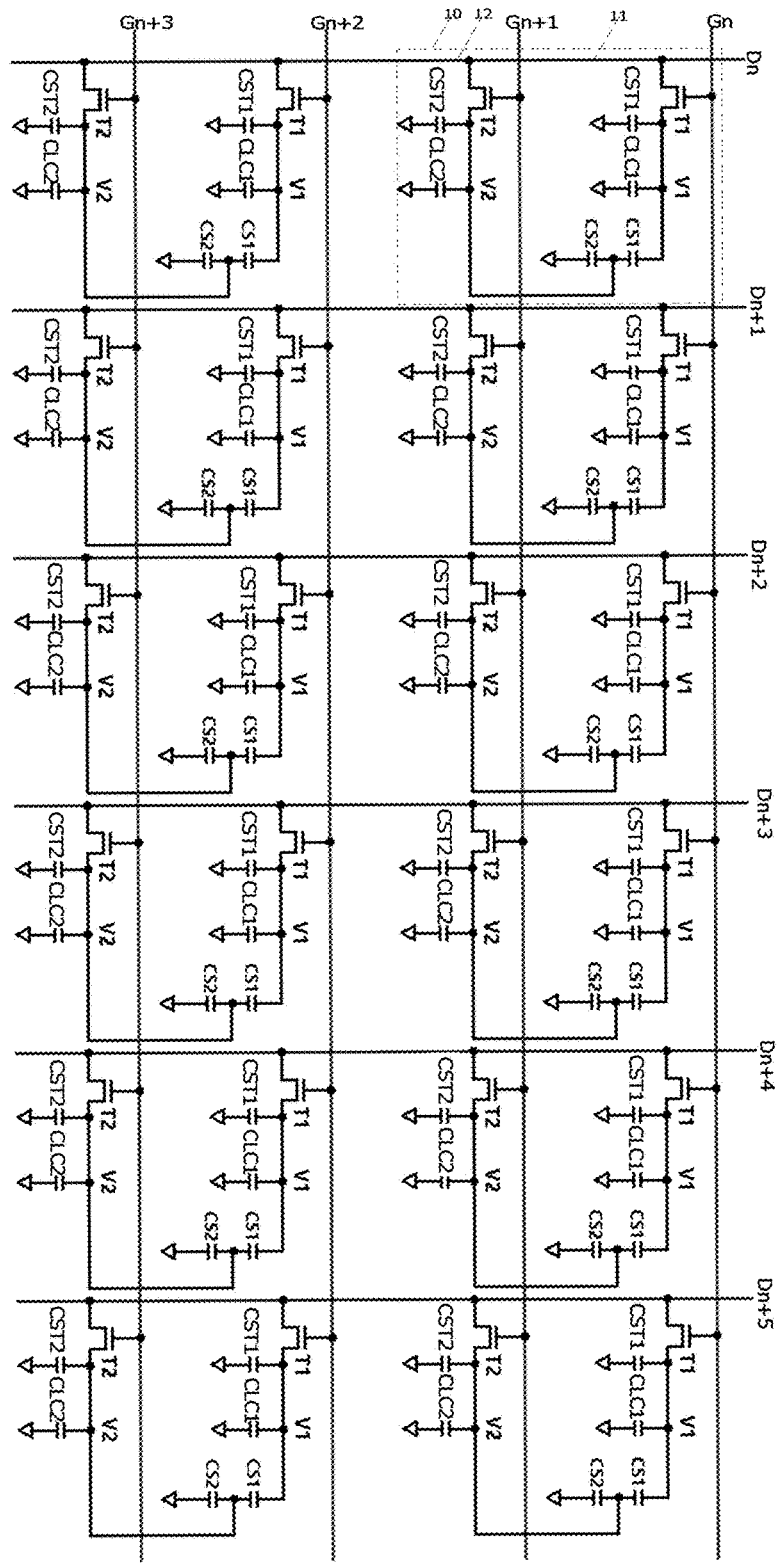
FIG. 3 illustrates a structural diagram of the liquid crystal display panel according to a first embodiment of the present disclosure.

Please refer to FIGS. 3-6. FIG. 3 is a structural diagram of the liquid crystal display panel of present disclosure.

The liquid crystal display panel of this embodiment includes a plurality of data lines Dn–Dn+5, a plurality of scan lines Gn–Gn+3, and a plurality of pixel sets 10. Each of the pixel sets 10 includes two adjacent pixel units. The pixel units which are restricted by a plurality of scan lines are composed in plural rows. The pixel units which are restricted by a plurality of data lines are composed in a plurality of columns. Each one row of the pixel units is disposed with a scan line. Each one column of the pixel units is disposed with a data line.

Figure 4:
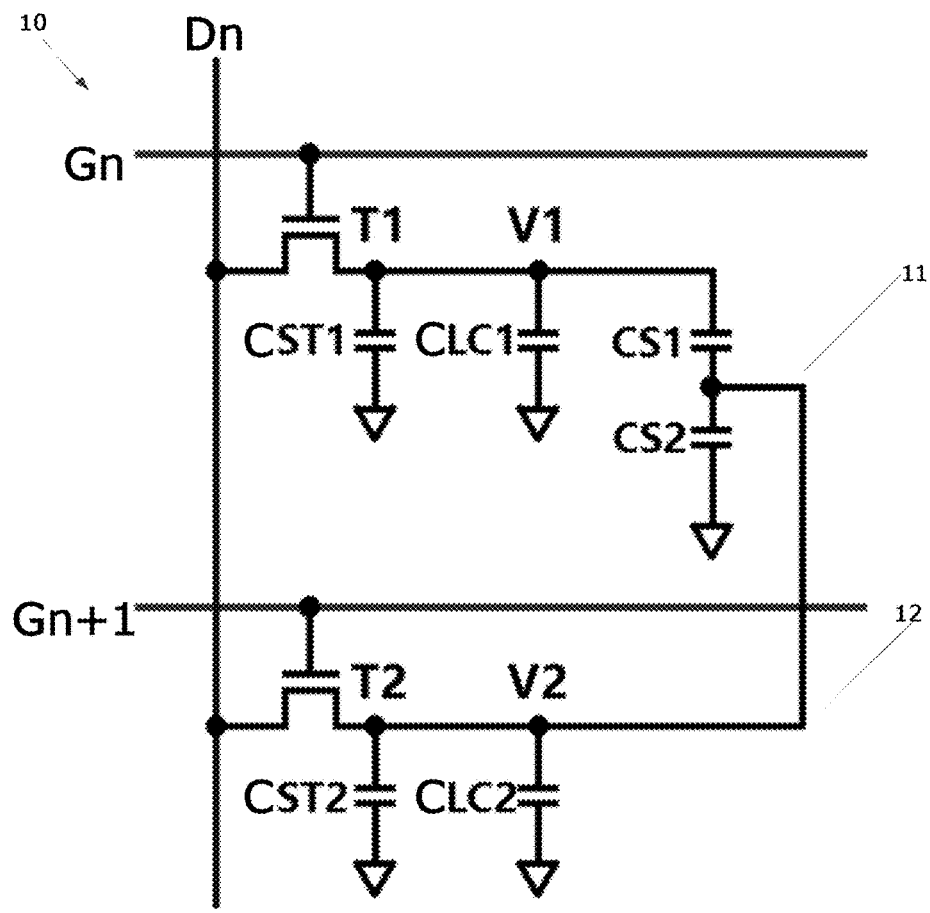
FIG. 4 illustrates a structural diagram of a pixel of the liquid crystal display panel in the present disclosure.

Referring to FIG. 4, each of the pixel sets 10 includes a first pixel unit 11 and a second pixel unit 12. The first pixel unit 11 includes a first thin film transistor T1, a first storage capacitor CST1, a first liquid crystal capacitor CLC1, a first charging capacitor CS1, and a second charging capacitor CS2. A gate of the first thin film transistor T1 is connected to a corresponding scan line. A source of the first thin film transistor T1 is connected to a corresponding data line. One side of both the first storage capacitor CST1 and the first liquid crystal capacitor CLC1 are connected to the drain of the first thin film transistor T1. The other side of the first storage capacitor CST1 is connected to a common electrode on one side of the array substrate. The other side of the first liquid crystal capacitor CLC1 is connected to a common electrode one side of the color film substrate. One side of the first charging capacitor CS1 is connected to a drain of the first thin film transistor T1. The other side of the first charging capacitor CS1 is connected to one side of the second charging capacitor CS2. The other side of the second charging capacitor is connected to the common electrode on the side of the array substrate.

The second pixel unit includes a second thin film transistor T2, a second storage capacitor CST2, and a second liquid crystal capacitor CLC2. The gate of the second thin film transistor T2 is connected to a corresponding scan line. The source of the second thin film transistor T2 is connected to a corresponding data line. One side of both the second storage capacitor CST2 and the second liquid crystal capacitor CLC2 are connected to the drain of the second thin film transistor T2. The other side of the second storage of the CST2 is connected to a common electrode on the side of the array substrate. The other side of the second liquid crystal capacitor CLC2 is connected to a common electrode on the side of the color film substrate. The drain of the second thin film transistor T2 is still connected to the other side of the first charging capacitor CS1. More specifically, the drain of the second thin film transistor T2 is connected to a node between the first charging capacitor CS1 and the second charging capacitor CS2.

The first pixel unit 11 and the second pixel unit 12 are arranged in alternating rows. For example, a first pixel unit is disposed on the first row, a second pixel unit is disposed on the second row, a first pixel unit is disposed on the third row, a second pixel unit is disposed on the forth row. The first pixel unit 11 and the second pixel unit 12 are disposed on adjacent rows. For example, when the first pixel unit is disposed on the nth row, the second pixel unit is disposed on the (n+1)th row. The liquid crystal display panel includes N rows of pixel where 0<n<N, N≥2.

Figure 5:
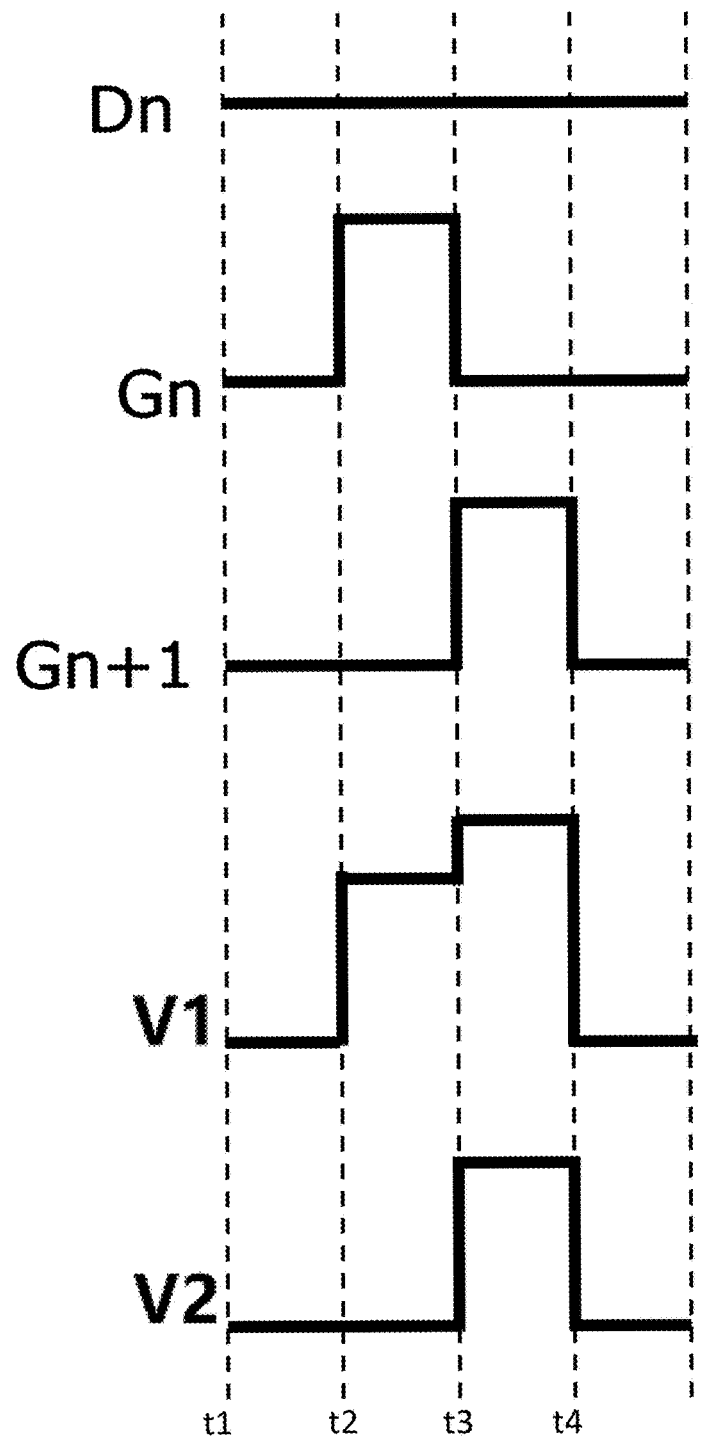
FIG. 5 illustrates waveforms of the driving signals corresponding to FIG. 4.

In the specific driving process shown in FIG. 5, during the period of t2-t3, the scan signal being inputted by Gn is high, the first thin film transistor T1 is closed which makes the voltage of first pixel unit V1 be equal to the data voltage, i.e. high. Therefore the scan signal being inputted by the scan line Gn+1 is low, and the voltage pf the second pixel unit 12 is low. During the period of t3-t4, the signal being inputted by scan line Gn+1 is high, and the second thin film transistor T2 is closed. Keep charging the first charging capacitor CS1 while charging the second pixel unit 12 in order to increase V1, i.e. V1 will be higher than V2. Therefore, the brightness of the first pixel unit 11 is higher than the brightness of the second pixel unit 12, and the viewing angle is increased as well. After the time of t4, V1 and V2 become low since the signal of the scan line is low.

Figure 6:
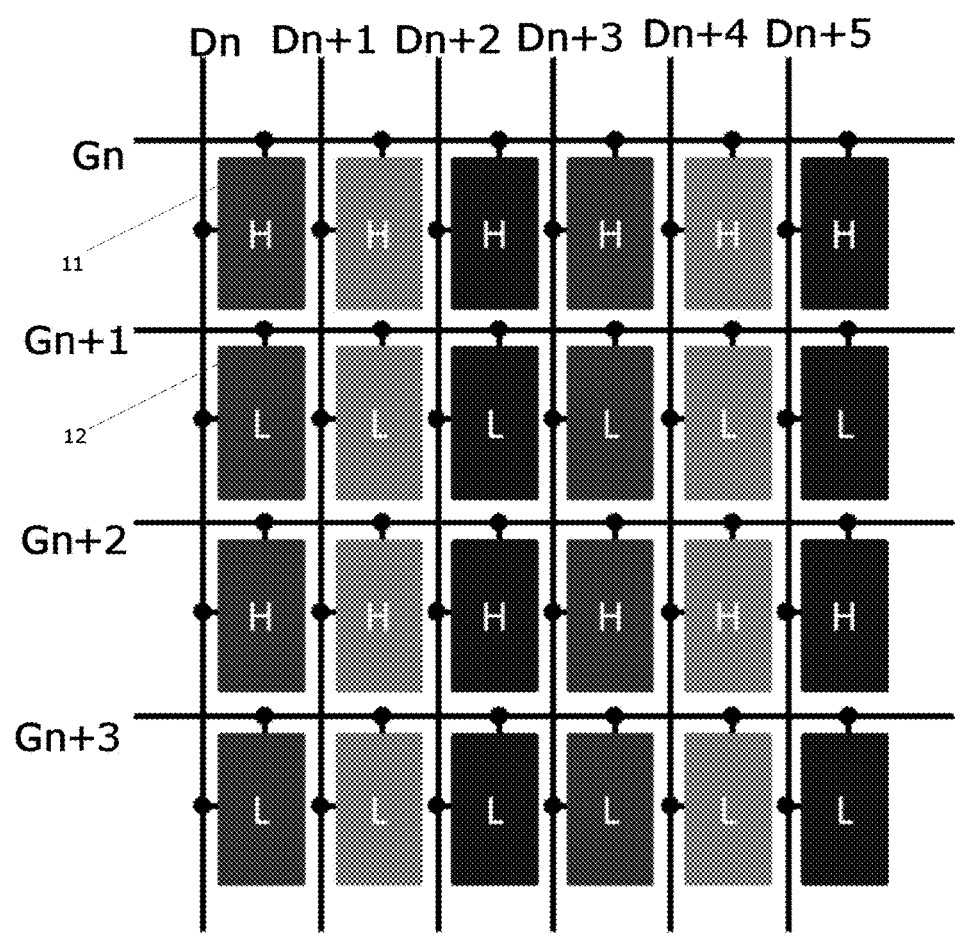
FIG. 6 illustrates the diagram of the display brightness corresponding to FIG. 4.

FIG. 6 shows that the display brightness corresponds to FIG. 4. As shown in FIG. 6, H represents that the brightness or voltage of a pixel unit is higher, and L represents that the brightness or voltage of a pixel unit is lower. Since the first pixel unit and the second pixel unit are arranged alternately row by row, all the pixel units at high potential will be located on the same row, and all the pixel units in low potential will be located on the same tow. Therefore, the brightness of the liquid crystal display panel from up to bottom is in the order of high, low, high, low. The manufacturing process will be simplified due to the regular structure of this kind of panel. The liquid crystal display panel divides the voltage of the adjacent pixel units, thus the viewing angle is increased. The colors of each row of pixel units are red, green, blue, red, green, and blue, respectively.

Figure 1:
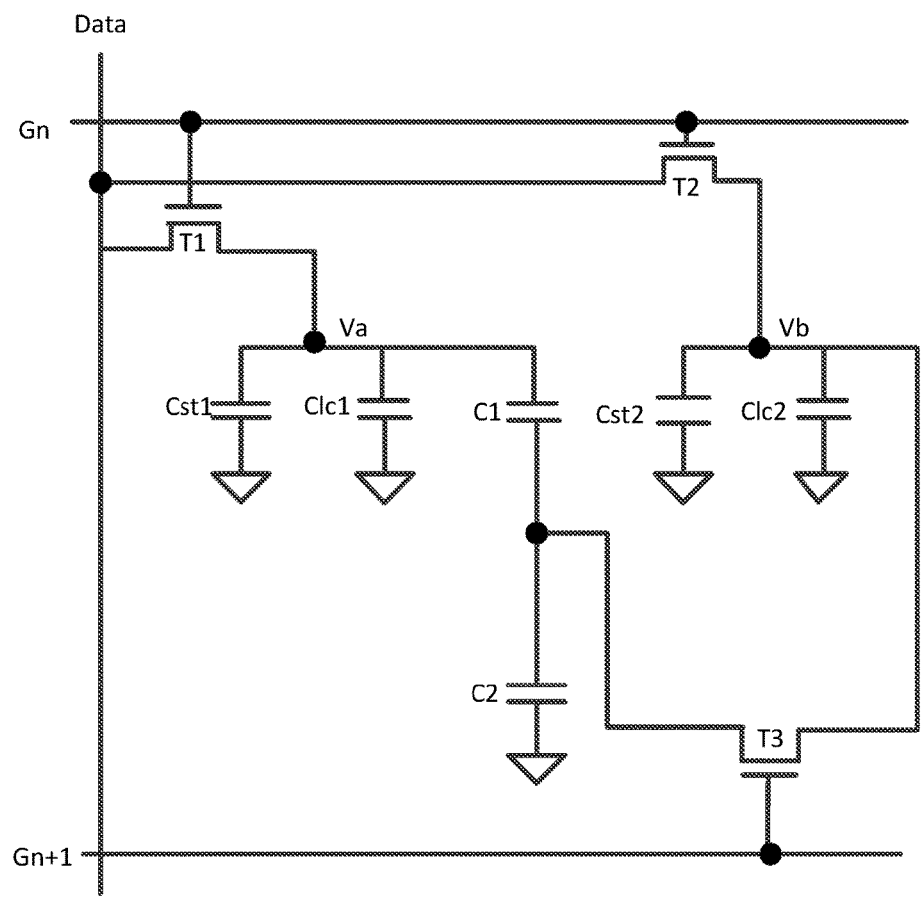
FIG. 1 illustrates a structural diagram of a present liquid crystal display panel.
Figure 2:
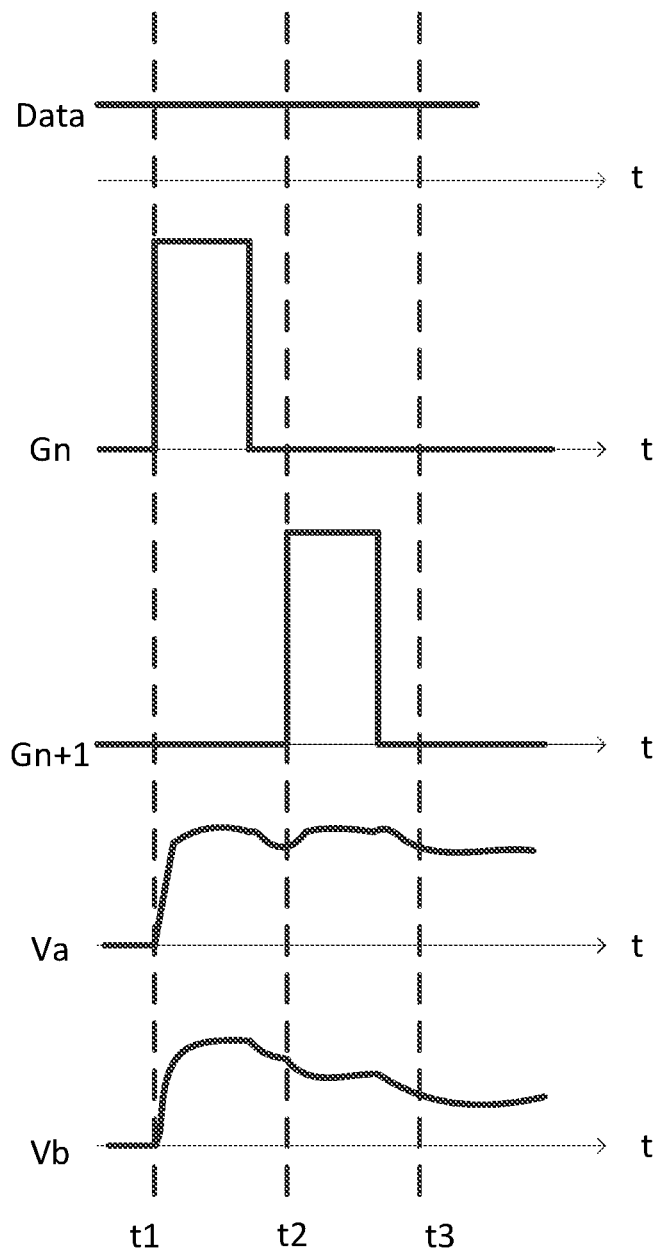
FIG. 2 illustrates waveforms of voltages applied on a main pixel unit and a sub-pixel unit in FIG. 1.

In contrast with the liquid crystal display panel in FIG. 1, the number of TFTs is reduced since each of the pixel units requires only one, instead of three, thin film transistors. The number of capacitors is reduced since each two of the pixel units requires one set of CS1 and CS2, rather than each one of the pixel units requires one set of CS1 and CS2. Therefore the aperture ratio and the transmittance ratio are increased because usage of thin film transistors and capacitors is decreased.

It can be understood that the positions of the first pixel unit 11 and the second pixel unit 12 can be switched.

Figure 7:
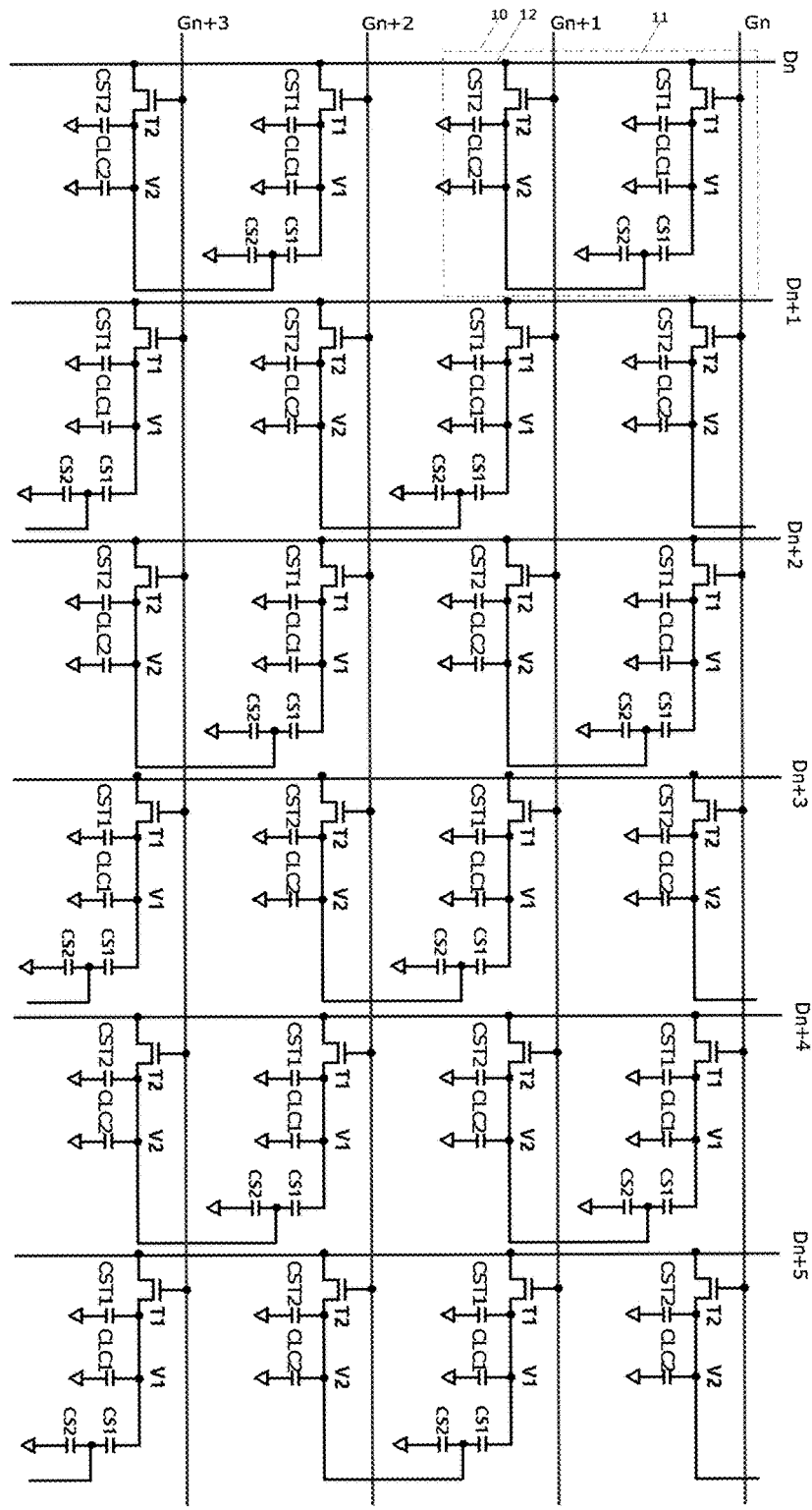
FIG. 7 illustrates a structural diagram of the liquid crystal display panel according to a second embodiment of the present disclosure.
Figure 8:
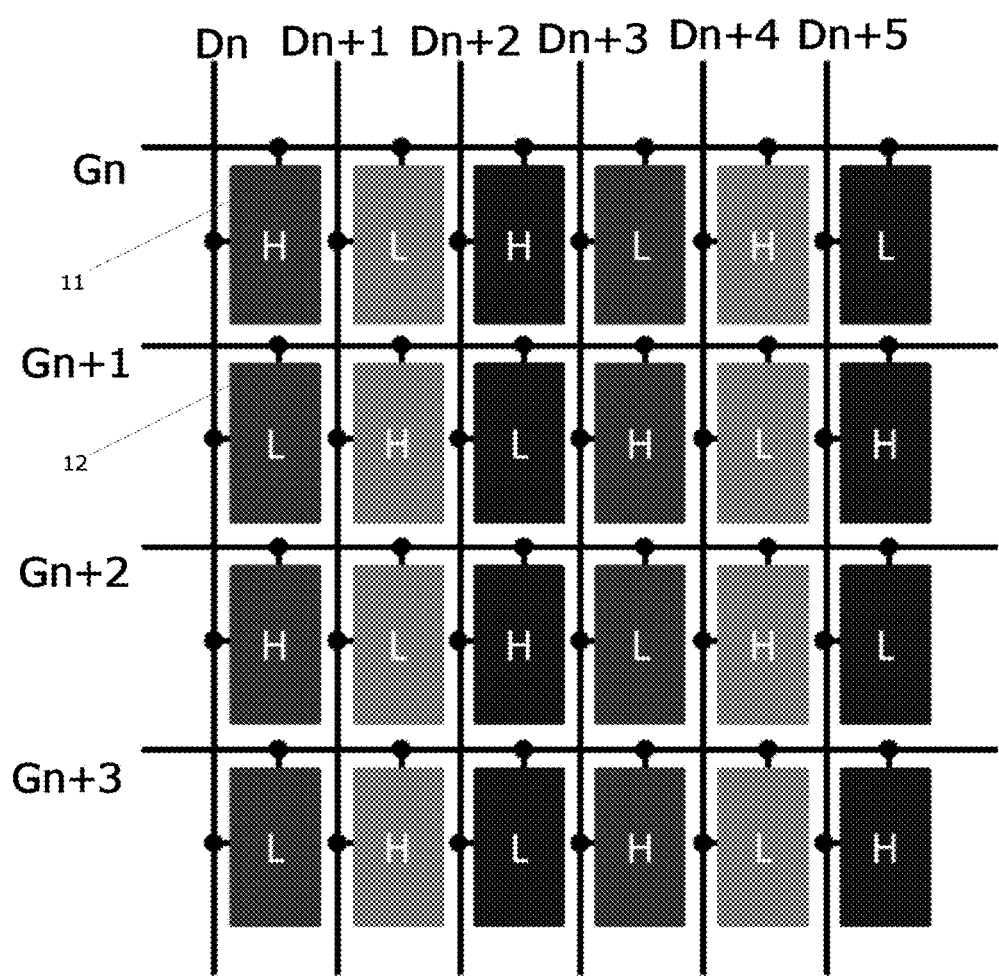
FIG. 8 illustrates a diagram of the display brightness corresponding to FIG. 7.

Please refer to FIG. 7-8. FIG. 7 illustrates the second structural diagram of the liquid crystal display panel of present disclosure.

One main distinction between this embodiment and the above embodiment of the present disclosure is that the first pixel unit 11 and the second pixel unit 12 are arranged alternately. Where in the one of the embodiments, the first pixel unit 11 is disposed on an nth row and a (2k+1)th column (i.e., odd columns), or an (n+1)th row and a (2k)th column (i.e., even columns); the second pixel unit is disposed on an (n+1)th row and a (2k+1)th column, or an nth row and a (2k)th column. The liquid crystal display panel comprises N rows of pixel units where 0<n<N, N≥2, k≥0.

As shown in FIG. 8, the pixel units at high potential and the pixel units in low potential are disposed alternately since the first pixel unit and the second pixel unit are disposed alternately, i.e., the brightness of two adjacent pixel units are different. The light lines and dark lines can be avoided, and thus the display performance is improved on the basis of the first embodiment.

Figure 9:
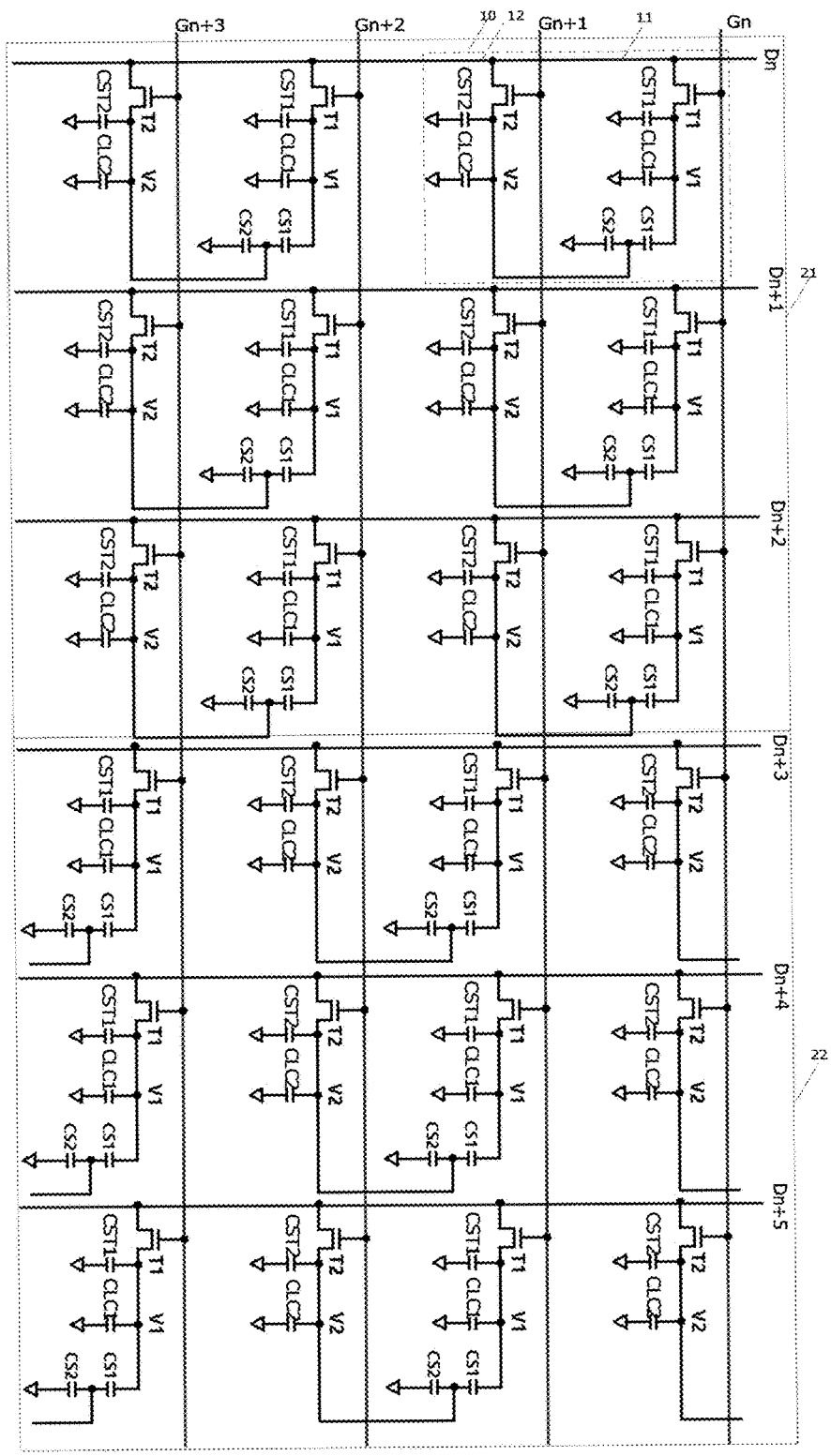
FIG. 9 illustrates a structural diagram of the liquid crystal display panel according to a third embodiment of the present disclosure.
Figure 10:
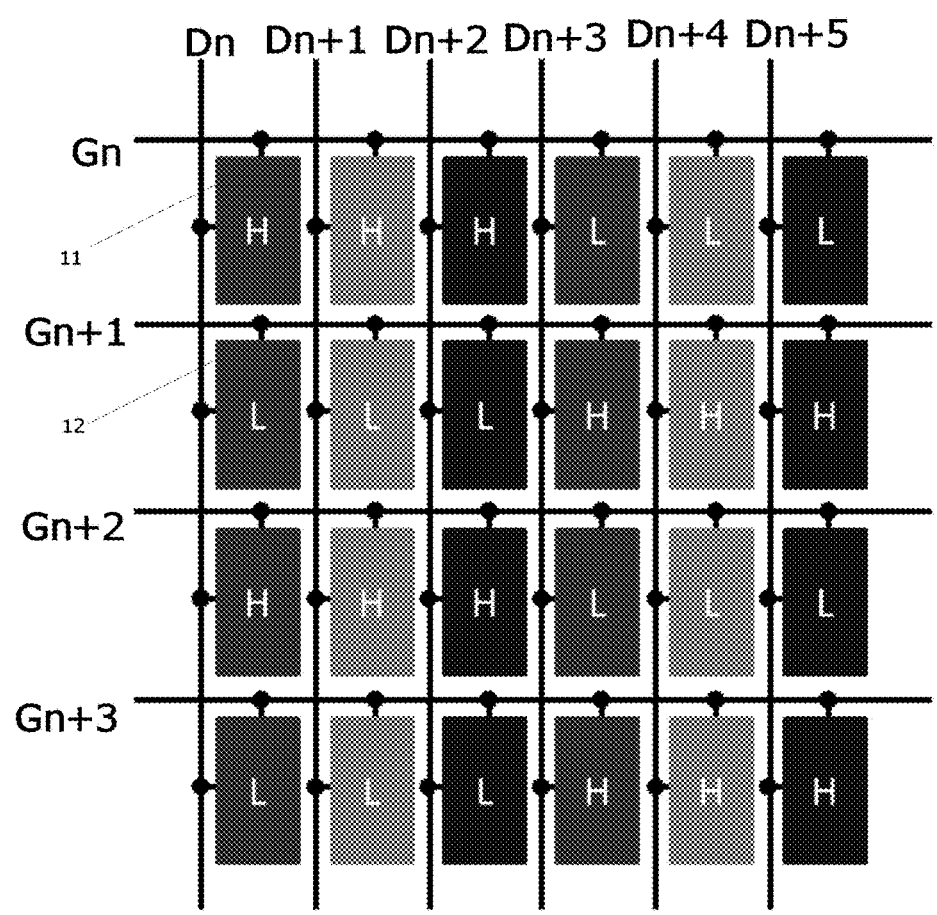
FIG. 10 illustrates a diagram of the display brightness corresponding to FIG. 9.

Please refer to FIG. 9-10. FIG. 9 illustrates the third structural diagram of the liquid crystal display panel of present disclosure.

One main distinction between this embodiment and the first embodiment in the present disclosure is that the liquid crystal display panel includes a first region 21 and a second region 22. To improve the prevention of the appearance of the light lines and dark lines, in one of the embodiments, the area of the first region 21 is equal to the area of the second region 22. In one of the embodiment, the first region and the second region are the left part and the right part of the liquid crystal display panel respectively. In another embodiment, the first region and the second region are the upper part and the lower part of the liquid crystal display panel respectively.

The first pixel unit 11 in the first region 21 and the second pixel unit 12 in the second region 22 are located in the same row. The second pixel unit 12 in the first region 21 and the first pixel unit 11 in the second region 22 are located in the same row.

The first pixel unit 11 in the first region 21 and the second pixel unit 12 in the first region 21 are arranged alternately row by row. The first pixel unit 11 in the second region 22 and the second pixel unit in the second region 22 are arranged alternately column by column.

More specifically, when the first pixel unit in the first region 21 is located in the nth row, the second pixel unit in the first region 21 will be located in the (n+1)th row.

When the first pixel unit 11 in the second region 22 is located in the (n+1)th row, the second pixel unit 12 in the second region 22 is located in the nth row.

As shown in FIG. 10, since the positions of the first pixel unit and the second pixel unit are different in the first region and second region, three pixel units at high potential and three pixel units in low potential are located in the same row, i.e., the pixel units at high potential and the pixel units in the low potential are arranged symmetrically; i.e., half of the pixel units of one row have a different brightness from the other half of the pixel units of the same row. On the basis of the first embodiments, the light lines and dark lines are prevented, the pixel units are arranged in order, and the manufacturing procedure is simplified.

It could be understand that the number of the first region and the number of the second region may not be limited to only one. In other embodiments, the liquid crystal display panel includes two of the first regions and one of the second regions. In this situation, the second region is disposed between the two of the first regions. Two of the first regions are disposed on each side of the display panel respectively. In one of the embodiments, the area of two first regions is equal to the area of the second region. In one of the embodiments, the area of two first regions could be not equal to the area of the second region.

The first pixel unit in the two first regions and the second pixel unit in the second region are disposed in the same row; the second pixel unit of the two first regions and the first pixel unit in the second region are disposed in the same row. The first pixel unit in the first region and the second pixel unit in the first region are arranged alternately row by row. The first pixel unit in the second region 22 and the second pixel unit in the second region are arranged alternately column by column.

The present disclosure further provides a liquid crystal display panel which includes a backlight module and any one of the abovementioned liquid crystal display panels.

The liquid crystal display panel and apparatus of present disclosure keeps charging the previous pixel while charging the next pixel, in order to make the brightness of the adjacent pixel units different and increase the viewing angle of the liquid crystal display panel. In addition, the number of the thin film transistors and capacitors is decreased, thus the aperture ratio and transmittance ratio are increased.

In conclusion, although this disclosure has been disclosed through the preferable embodiments above, the preferable embodiments above are not utilized to limit this disclosure. One having ordinary skills can change and modify without violating the concepts and scope of this disclosure. Therefore, the scope that this disclosure protects is based on the scope defined by the claims.

What is claimed is:

1. A liquid crystal display panel, comprising: a plurality of data lines, a plurality of scan lines, and a plurality of pixel sets comprising a first pixel unit and a second pixel unit; wherein rows of pixel units are arranged with corresponding scan lines, columns of pixels units are arranged with corresponding data lines;

wherein the first pixel unit comprises a first thin film transistor, a first charging capacitor, a second charging capacitor, a first storage capacitor, and a first liquid crystal capacitor; a gate of the first thin film transistor is connected to a corresponding scan line, and a source of the first thin film transistor is connected to a corresponding data line; the first charging capacitor is connected between a drain of the first thin film transistor, and the second charging capacitor; the first storage capacitor and the first liquid crystal capacitor are connected to the drain of the first thin film transistor;

the second pixel unit comprises a second thin film transistor, a second storage capacitor and a second liquid crystal capacitor; a gate of the second thin film transistor is connected to a corresponding scan line, a source of the second thin film transistor is connected to a corresponding data line; a drain of the second thin film transistor is connected to the first charging capacitor, the second storage capacitor and the second liquid crystal capacitor are connected to the drain of the second thin film transistor; wherein a brightness of the first pixel unit is higher than a brightness of the second pixel unit wherein the liquid crystal display panel comprises a first region and a second region, the first pixel unit of the first region is disposed on a same row as the second pixel unit of the second region; the second pixel unit of the first region is disposed on a same row as the first pixel unit of the second region;

the first pixel unit of the first region is arranged in alternate rows with the second pixel unit of the first region; the first pixel unit of the second region is arranged in alternate rows with the second pixel unit of the second region.

2. The liquid crystal display panel according to claim 1, wherein the first pixel unit and the second pixel unit are arranged in alternate rows.

3. The liquid crystal display panel according to claim 1, wherein the first pixel unit and the second pixel unit are arranged alternately.

4. The liquid crystal display panel according to claim 3, wherein the first pixel unit is disposed on an nth row and a (2k−1)th column and disposed on an (n+1)th row and a (2k)th column; the second pixel unit is disposed on an (n+1)th row and a (2k−1)th column and disposed on an nth row and a (2k)th column, where the liquid crystal display panel comprises N rows of pixel units, where n, k, N are integers, where 0<n<N, N≥2, k≥1.

5. The liquid crystal display panel according to claim 1, wherein an area of the first region is equal to an area of the second region.

6. The liquid crystal display panel according to claim 1, wherein the liquid crystal display panel comprises two first regions and a second region between the two first regions.

7. The liquid crystal display panel according to claim 5, wherein a total area of the two first regions is equal to the area of the second region.

8. A liquid crystal display panel, comprising: a plurality of data lines, a plurality of scan lines, and a plurality of pixel sets comprising a first pixel unit and a second pixel unit; wherein rows of pixel units are arranged with corresponding scan lines, columns of pixels units are arranged with corresponding data lines;

wherein the first pixel unit comprises a first thin film transistor, a first charging capacitor, and a second charging capacitor; a gate of the first thin film transistor is connected to a corresponding scan line, and a source of the first thin film transistor is connected to a corresponding data line; the first charging capacitor is connected between a drain of the first thin film transistor, and the second charging capacitor;

wherein the second pixel unit comprises a second thin film transistor; a gate of the second thin film transistor is connected to a corresponding scan line, a source of the second thin film transistor is connected to a corresponding data line; a drain of the second thin film transistor is connected to the first charging capacitor;

wherein the liquid crystal display panel comprises a first region and a second region, the first pixel unit of the first region is disposed on a same row with the second pixel unit of the second region; the second pixel unit of the first region is disposed on a same row with the first pixel unit of the second region;

the first pixel unit of the first region is arranged in alternate rows with the second pixel unit of the first region; the first pixel unit of the second region is arranged in alternate rows with the second pixel unit of the second region.

9. The liquid crystal display panel according to claim 8, wherein the first pixel unit and the second pixel unit are arranged in alternate rows.

10. The liquid crystal display panel according to claim 8, wherein the first pixel unit and the second pixel unit are arranged alternately.

11. The liquid crystal display panel according to claim 10, wherein the first pixel unit is disposed on an nth row and a (2k−1)th column and disposed on an (n+1) row and a (2k)th column; the second pixel unit is disposed on an (n+1)th row and a (2k−1)th column and disposed on an nth row and a (2k)th column, where the liquid crystal display panel comprises N rows of pixel units, where n, k, N are integers, where 0<n<N, N≥2, k≥1.

12. The liquid crystal display panel according to claim 8, wherein an area of the first region is equal to an area of the second region.

13. The liquid crystal display panel according to claim 8, wherein the liquid crystal display panel comprises two first regions and a second region between the two first regions.

14. The liquid crystal display panel according to claim 13, wherein a total area of the two first regions is equal to the area of the second region.

15. The liquid crystal display panel according to claim 8, wherein the brightness of the first pixel unit is higher than a brightness of the second pixel unit.

16. A liquid crystal display device comprising a backlight module; and a liquid crystal display panel comprising: a plurality of data lines, a plurality of scan lines, and a plurality of pixel sets comprising a first pixel unit and a second pixel unit; wherein rows of pixel units are arranged with corresponding scan lines, columns of pixels units are arranged with corresponding data lines;

wherein the first pixel unit comprises a first thin film transistor, a first charging capacitor, and a second charging capacitor; a gate of the first thin film transistor is connected to a corresponding scan line, a source of the first thin film transistor is connected to a corresponding data line; the first charging capacitor is connected between a drain of the first thin film transistor, and the second charging capacitor;

the second pixel unit comprises a second thin film transistor; a gate of the second thin film transistor is connected to a corresponding scan line, a source of the second thin film transistor is connected to a corresponding data line; a drain of the second thin film transistor is connected to the first charging capacitor;

wherein the liquid crystal display panel comprises a first region and a second region, the first pixel unit of the first region is disposed on a same row as the second pixel unit of the second region; the second pixel unit of the first region is disposed on a same row as the first pixel unit of the second region;

the first pixel unit of the first region is arranged in alternate rows with the second pixel unit of the first region; the first pixel unit of the second region is arranged in alternate rows with the second pixel unit of the second region.

17. The liquid crystal display device according to claim 16, wherein the first pixel unit and the second pixel unit are arranged in alternate rows.

18. The liquid crystal display device according to claim 16, wherein the first pixel unit and the second pixel unit are arranged alternately.

* * * * *